United States Patent [19]

Thibert et al.

[11] Patent Number: 4,652,213
[45] Date of Patent: Mar. 24, 1987

[54] PROPELLER BLADE FOR AIRCRAFT PROPULSION

[75] Inventors: Jean-Jacques Thibert, Verrieres le Buisson; Jean-Marc Bousquet, Paris, both of France

[73] Assignee: Office National d'Etudes et de Recherches Aerospatiales, France

[21] Appl. No.: 724,945

[22] Filed: Apr. 19, 1985

Related U.S. Application Data

[63] Continuation of Ser. No. 552,764, Nov. 17, 1983, abandoned.

[30] Foreign Application Priority Data

Nov. 18, 1982 [FR] France .................. 82 19337

[51] Int. Cl.[4] ............................................. B64C 11/18
[52] U.S. Cl. .......................... 416/223 R; 416/DIG. 2; 244/35 R
[58] Field of Search ........ 416/DIG. 2, 223 R, 223 A; 244/35 R, 35 A

[56] References Cited

U.S. PATENT DOCUMENTS

| 3,343,512 | 9/1967 | Rasmussen | 416/DIG. 2 |
| 3,946,688 | 3/1976 | Gornstein et al. | 416/223 R |
| 4,142,837 | 3/1979 | De Simone | 416/223 R |
| 4,240,598 | 12/1980 | Vinas Espin et al. | 416/223 R |
| 4,325,675 | 4/1982 | Gallot et al. | 416/DIG. 2 |
| 4,412,664 | 11/1983 | Noonan | 416/223 R |
| 4,416,434 | 11/1983 | Thibert et al. | 416/223 R |
| 4,459,083 | 7/1984 | Bingham | 416/223 R |

FOREIGN PATENT DOCUMENTS 0125144 8/1947 Australia .................. 416/223 R

OTHER PUBLICATIONS

Abbott et al., "Theory of Wing Sections", N.Y., Dover, 1959, pp. 508–509.

Primary Examiner—Robert E. Garrett
Assistant Examiner—Joseph M. Pitko
Attorney, Agent, or Firm—Larson and Taylor

[57] ABSTRACT

The external part at least of a propeller blade, having a maximum relative thickness between about 2 and 6%, has a profile whose thickness variation law along the chord comprises a first zone (I) going from the leading edge to about 8% of the length of the chord in which the curvature decreases rapidly, from a maximum value at the leading edge, followed by a second zone (II) extending between about 8% of the chord and midships in which the curvature decreases linearly. In a third zone, extending from midships to 75 to 85% of the chord, the curvature is substantially constant. A fourth zone (IV), extending from the end of the third zone (typically at 80% of the chord) to the trailing edge, comprises a curvature inversion.

14 Claims, 10 Drawing Figures

PROPELLER BLADE FOR AIRCRAFT PROPULSION

This application is a continuation of application Ser. No. 552,764 filed Nov. 17, 1983 now abandoned.

BACKGROUND AND SUMMARY OF THE INVENTION

The invention relates to propellers for aircraft propulsion systems and more particularly, the blades for such propellers.

The theoretical efficiency of a propeller for a predetermined load at the propeller disk $C=P/D^2$ (P being the power on the propeller shaft and D the diameter) increases with the rotational speed of the propeller. But the adoption of a high rotational speed comes up against a problem: the composition of the speed due to the rotation of the propeller and of the speed of advance of the aircraft leads to relative Mach numbers which increase progressively from the root of the blade to its tip. In conventional propellers the Mach number frequently reaches values of about 0.9 even when the forward speeds are moderate, for example about $M=0.6$. At these relative high Mach numbers, there already appears on conventional thin profiles intense shock waves causing separation of the limit layer and resulting into high loss. Consequently, the propulsive efficiency of conventional propellers decreases rapidly, at the same propeller speed, when the speed of the aircraft increases; as a consequence, propeller engines have been replaced with other types of propulsion units, particularly turbojets, on airplanes whose speed exceeds about $M=0.65$.

Much work has already been done to increase the range of use of propellers towards higher Mach numbers. It has been proposed to use propellers presenting a very high disk load C, comprising a large number of blades whose radially outer parts are markedly swept back. An analysis of the work carried out on such propellers may be found in a number of documents, for instance in "Hélices pour vols économiques à grande vitesse", by Jean-Marc Bousquet, Aéronautique at Astronautique, No. 88, 1981-3, pp. 37-51. These propellers have an evolutive profile from the root to the tip, but the successive profiles belong to the conventional NACA series.

Such studies aim at reducing the resulting speed by reducing the propeller diameter and transposing the swept-back shape of wings to the field of the propellers. They do not deal with the very source of the problem, namely separation of the limit layer at a given speed.

It is an object of the invention to provide propulsion propeller blades which have improved characteristics at high relative Mach numbers, particularly between 0.8 and 0.9. It is a more particular object to delay appearance of transonic phenomena, such as the formation of intense shock waves and separation of the limit layer, up to high relative Mach numbers.

This result is reached by waiving the conventional blade profiles at least in that part of the blade which is farthest away from the axis of rotation of the propeller.

A few definitions will first be given to avoid ambiguity. An airfoil profile may be defined by a thickness variation law and a camber law along the chord C of the profile (the chord being the straight line segment connecting the leading edge and the trailing edge). The mean line of the profile, or "skeleton", is defined as being a line such that each of its points is equidistant from the extrados (upper surface) and the intrados (under surface) of the profile. The thickness of the profile is, at each point of the mean line, the distance between the extrados (upper surface) and the intrados (under surface). The thickness law may be represented by a curve plotted in a system of Cartesian coordinates where the position of each point along the chord is plotted in abscissa and the half-thickness at this point in ordinates. The curve thus obtained corresponds to half of a symmetrical profile (i.e. a profile where the chord constitutes the skeleton) corresponding to the thickness law represented. Other profiles having different maximum thickness ratios $e_{max}/c$ may be derived therefrom by multiplication of the ordinates by a coefficient equal to the ratio of the maximum thickness $e_{max}$ of the profile to be generated and of the base profile.

For that purpose, there is provided a blade which, at least in an external part, has a profile or cross-section which presents a law of thickness from the leading to the trailing edge different in several successive zones. In a first zone, extending from the leading edge to a point located at a fraction of the length of the chord between 7 and 10% (typically about 8%) the curvature decreases at a variable rate. As will appear from a consideration of FIG. 3, for instance, the curvature decreases in the first zone at a rate which is variable from a higher value near the leading edge to a lower value at the end of the first zone where the curve representing the curvature variation in the first zone merges with the curve representing the curvature in the second zone. In a second zone, following the first one and extending as far as the maximum thickness section, typically up to a point situated at between 28 and 35% of the length of the chord from the leading edge, the curvature decreases substantially linearly.

By applying such a law of thickness variation to a blade, propellers may be obtained having high efficiency levels, of about from 85 to 90%, for relative Mach numbers at the tip of the blade very much greater than those used with present day propellers. Consequently, for the same cruising Mach number, the rotational speed of the propeller may be increased, which increases the efficiency and reduces the mechanical reduction ratio between the output of the engine (generally a turboprop) and the propeller and reduces the weight of the speed reducing gear. On the other hand, the rotational speeds used at present may be retained while the cruising Mach number of the aircraft is increased and so the range of use of the propellers.

The above thickness variation law will generally be adopted in the radially outer part of the blade only, from 60% (and often only 70%) of the blade radius. The inner part may include conventional NACA profiles and a progressive merging zone.

The profile of the propeller is defined not only by the thickness variation law defined above but also by the camber law of the mean line of the profile. Camber is important as regards the lift capabilities of the blade. It will be explained in the following how an appropriate camber may provide an excellent value at the drag divergence Mach number (Mach number from which the drag increases sharply) for lift levels corresponding to the cruising speed of the aircraft equipped with the propeller along with high maximum lift levels for lower Mach numbers, close to 0.6 for example, which confers on the propeller having blades in accordance with the invention a yield level which is also very high for take-off and climbing speeds.

It seems that these favorable results can be at least in part attributed to the approximately linear decrease of the curvature of the curve representing the variation of the thickness between the first zone and the maximum thickness section. For a profile whose relative maximum thickness does not exceed about 6% and for the degrees of camber which are typically used, the substantially linear decrease allows the overspeeds at the extrados (upper surface) to be controlled and ensures progressive recompression upstream of the maximum thickness point thus avoiding the appearance of intense shock waves in transonic flow as well as separation of the limit layer.

It should be noted that this approximately linear decrease relates to the curvature of the thickness variation curve, and not the curvature of the upper or under surface, which will depend on the chamber and the relative thickness.

The second zone, with approximately linear decrease of the curvature, extends advantageously over a range between approximately 8% and 32% of the length of the chord and the curvature decreases in this second zone from a value of about $14e_{max}/c$ to a value substantially equal to $1.5e_{max}/c$, $e_{max}/c$ being the relative maximum thickness of the profile.

In a preferred embodiment of the invention, the radially outer part at least of a propeller blade, having a relative maximum thickness between about 2 and 6%, has a profile whose thickness variation law along the chord comprises a first zone extending from the leading edge to about 8% of the length of the chord, in which the curvature decreases from a maximum value equal to about $0.5c/(e_{max})^2$ at the leading edge to a value substantially equal to $14e_{max}/c$ at the end of said first zone, followed by a second zone extending between about 8% of the chord and the maximum thickness point (typically located at about 32% of the chord) in which the curvature decreases linearly from a value substantially equal to $14e_{max}/c$ to a value substantially equal to $1.5e_{max}/c$.

The second zone of the thickness law curve merges with a curve portion extending up to the trailing edge. That portion may include a third zone and a fourth zone where the thickness variation laws are different. In the third zone, extending from the maximum thickness section to a point located at from 75 to 80% of the chord, the curvature is substantially constant, equal to about $1.5e_{max}/c$ in the example referred to in the preceding paragraph. This third zone further promotes control of the flow along the profile at high Mach numbers. The result is that the extent of the supersonic zone increases when the Mach number increases, without correlative increase of the intensity of the recompression shock wave terminating the supersonic zone and that there is, downstream of the shock wave, low recompression gradients which avoid separation of the boundary layer.

The fourth zone, extending from the end of the third zone (typically at 80% of the chord) to the trailing edge, comprises curvature inversion. This particular evolution of the curvature, in this fourth zone, causes reacceleration of the flow in the final part (typically practically the last ten percent) of the chord just before the trailing edge, thus contributing to delaying the appearance of separation and obtaining low drag levels.

To the favorable effect of the curvature variation of the thickness law in the second zone is added that of the first zone, with wide leading edge radius and rapid evolution of the curvature. The overspeed and the recompression gradient are reduced with respect to those met with in conventional profiles with small leading edge radius, such as those of the NACA series 16 whose use has been suggested on the external half of the transonic propeller blades. Thus, leading edge boundary layer separation, characteristic of thin profiles is delayed and maximum lift coefficients are obtained greater than those of conventional profiles.

As was pointed out above, the profile of a blade is defined not only by the thickness variation law which has just been considered, but also by its camber. Since the above defined thickness variation law allows lift coefficient levels to be obtained greater than those of conventional profiles, a skeleton may be adopted having a maximum camber less than that of a conventional profile, for a given maximum lift coefficient. As a general rule, the maximum camber $a_p$ of the skeleton of a profile in accordance with the invention may be chosen between 0.75 and $0.85a_c$ (typically approximately $0.81a_c$), $a_c$ representing the maximum camber of the skeleton of a conventional profile, for example NACA series 16.

It will generally be advantageous to adopt a camber law along the chord representing the shape of the skeleton, broken down into three successive zones corresonding respectively to the portions:
between the leading edge (point of maximum curvature) and a maximum camber point;
between the maximum camber point and a point situated at about 65% along the chord;
between this latter point and the trailing edge.

The maximum camber point is situated advantageously in a range extending over 10% of the chord about midships. It may be situated approximately at 35% of the chord from the leading edge, whereas in general the maximum camber $a_c$ of the conventional profiles of the series NACA 16 is placed at 50% of the chord; the corresponding maximum camber may be of the order of 0.0136C. Because of the reduction of the maximum camber and transfer thereof towards the front, the profile of the invention has, for a maximum lift coefficient at least equal to the maximum lift coefficients of conventional profiles, a lower coefficient of moment $c_m$, which reduces the twisting stresses of the blades prejudicial to its mechanical strength.

Once a certain number of typical profiles have been determined, for a given maximum relative thickness (equal to 3.5% for example), other profiles conformable to the invention may be derived whose relative maximum thickness is between 2 and 6%, by simple multiplication of the ordinates by the ratio of the desired maximum relative thickness at the value 0.035.

To facilitate the plotting of profiles in accordance with the invention, it is advantageous to define the thickness law and the skeleton by functions of the form $Y=f(X)$ allowing the particular characteristics of the different successive zones of the profile to be restored. In particular, polynomial functions of sufficient order may be used.

The invention will be better understood from reading the following description of an installation which forms one particular embodiment thereof, given by way of example.

DETAILED DESCRIPTION OF PREFERRED EMBODIMENTS

Figure 1:
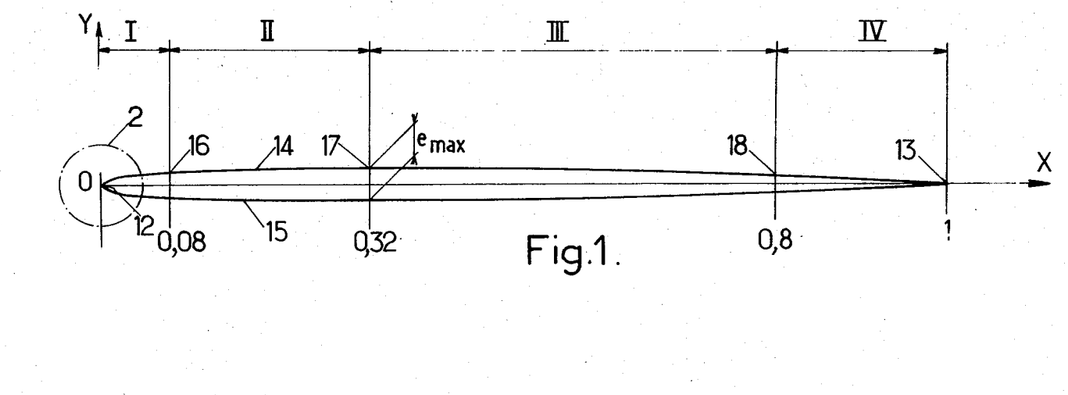
FIG. 1 is a representative curve of the thickness law of a symmetrical profile in accordance with the invention, the half thickness being plotted as ordinates as a function of the distance to the leading edge along the chord c (expressed in percentage of the chord) plotted as abscissa.

The graphic representation of a thickness law of FIG. 1 may be regarded as showing a symmetrical profile having that thickness law: this profile comprises a leading edge 12 and a trailing edge 13 connected by a symmetrical extrados 14 and intrados 15, convex in their major part but concave in the vicinity of the trailing edge 13. The axis of the abscissa OX merges with the skeleton and the chord and the origin O merges with the leading edge 12. Axis OX is orientated positively from the leading edge 12 to the trailing edge 13, axis OY being orientated positively from the intrados 15 to the extrados 14. The profile may be regarded as comprising four successive zones I, II, III, and IV.

Figures 2, 3:
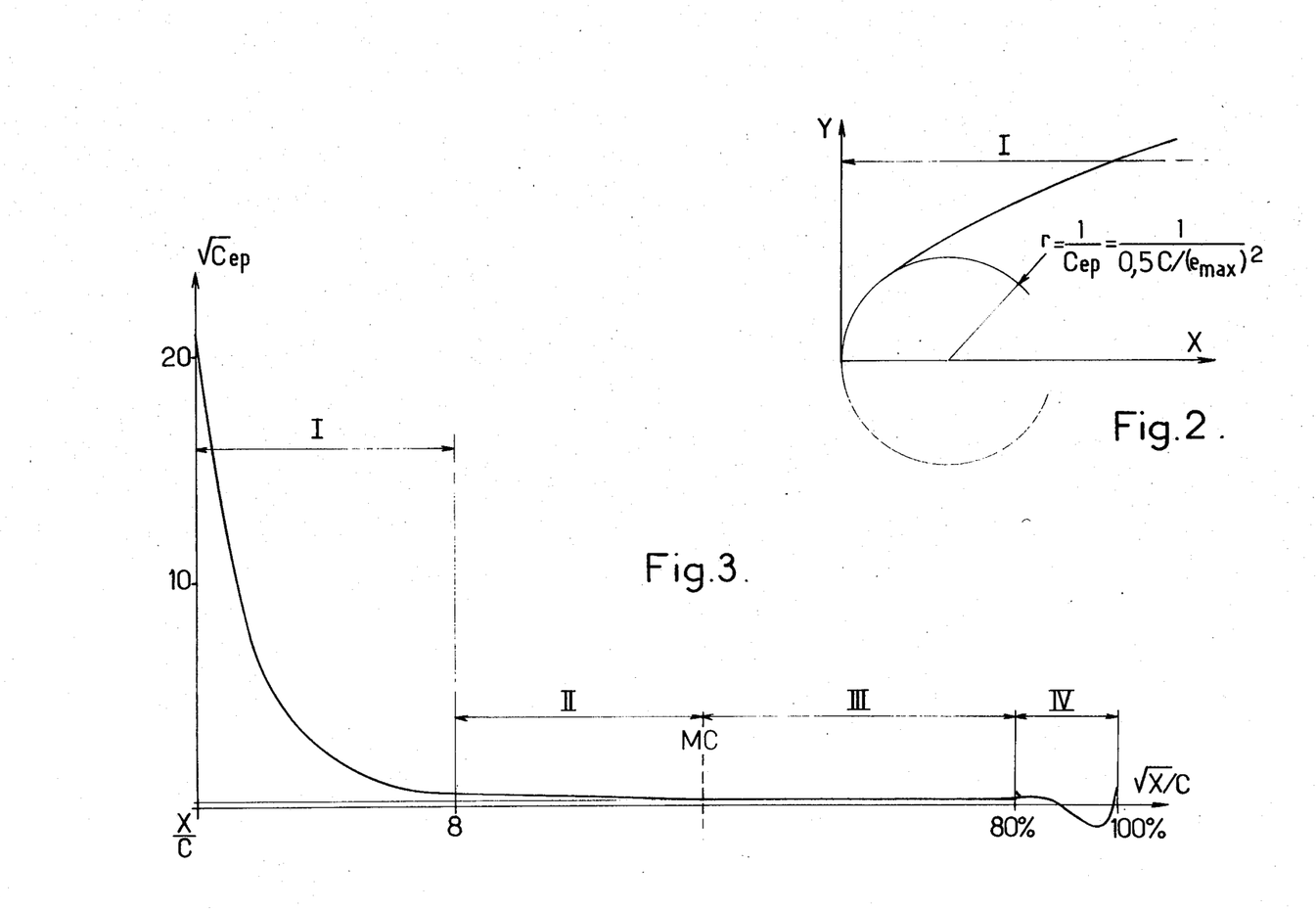
FIG. 2 is an enlarged view of the region shown at 2 in FIG. 1, in the vicinity of the leading edge.
FIG. 3 shows the variation of the curvature $C_{ep}$ of the thickness law as a function of the reduced abscissa X/C along the chord, the scales being in square roots so as to facilitate the representation, (the parts of the curve above and below the axis of the abscissa corresponding to curvatures of opposite signs)

The first zone I begins at the leading edge 12, shown on a large scale in FIG. 2. This first zone presents a rapid decrease of the curvature. In the case of a leading edge in the form of an arc of a circle, the first zone will have a maximum curvature corresponding to the radius of the circle. In the second zone II, the curvature decreases linearly. The law of thickness between the leading edge and midships (end of zone II) may frequently be represented by a formula of the kind:

$$y = U_1 x^6 + U_2 x^5 + U_3 x^4 + U_4 x^3 + U_5 x^2 + U_6 x + U_7 x^{\frac{1}{2}} \tag{1}$$

where $U_1, \ldots U_7$ are constant coefficients, y and x being related to the length C of the chord.

In the case where the second zone II extends as far as 32% of the chord and where the relative maximum thickness $e_{max}/C$ is equal to 0.035, the coefficients of the formula (1) have approximately the values:

$U_1 = -44.937$
$U_2 = 49.052$
$U_3 = -19.232$
$U_4 = 3.0433$
$U_5 = -0.1028$
$U_6 = -0.0720$
$U_7 = -0.0649$

In FIGS. 1 and 2, the curvature in the first zone II decreases from $0.5C/e_{max}^2$ at the leading edge 12 to $14e_{max}/C$ at 16, situated at a reduced abscissa x=0.08.

The second zone II, which extends from point 16 to a point 17 where the thickness of the profile is maximum, situated advantageously at an abscissa equal to about 32% of the chord, presents a substantially linear decrease of the curvature from a value $14e_{max}/C$ at point 16 to a value equal to $1.5e_{max}/C$ at point 17, at the end of the second zone II, as shown in FIG. 3.

With this particular evolution of the curvature, a low overspeed level is obtained in the forward zone of the profile, up to about x/C=0.2 then progressive recompression without shock as far as midships at 17. The curve O of FIG. 4, corresponding to a Mach number of 0.88, shows the high value of the Kp coefficient up to about 20% of the chord, and maintenance thereof at a value higher than that for the NACA profile for the whole of the second zone, terminated by the midships MCO situated much more forwardly than the midships MCP of the NACA profile.

Figures 4, 5:
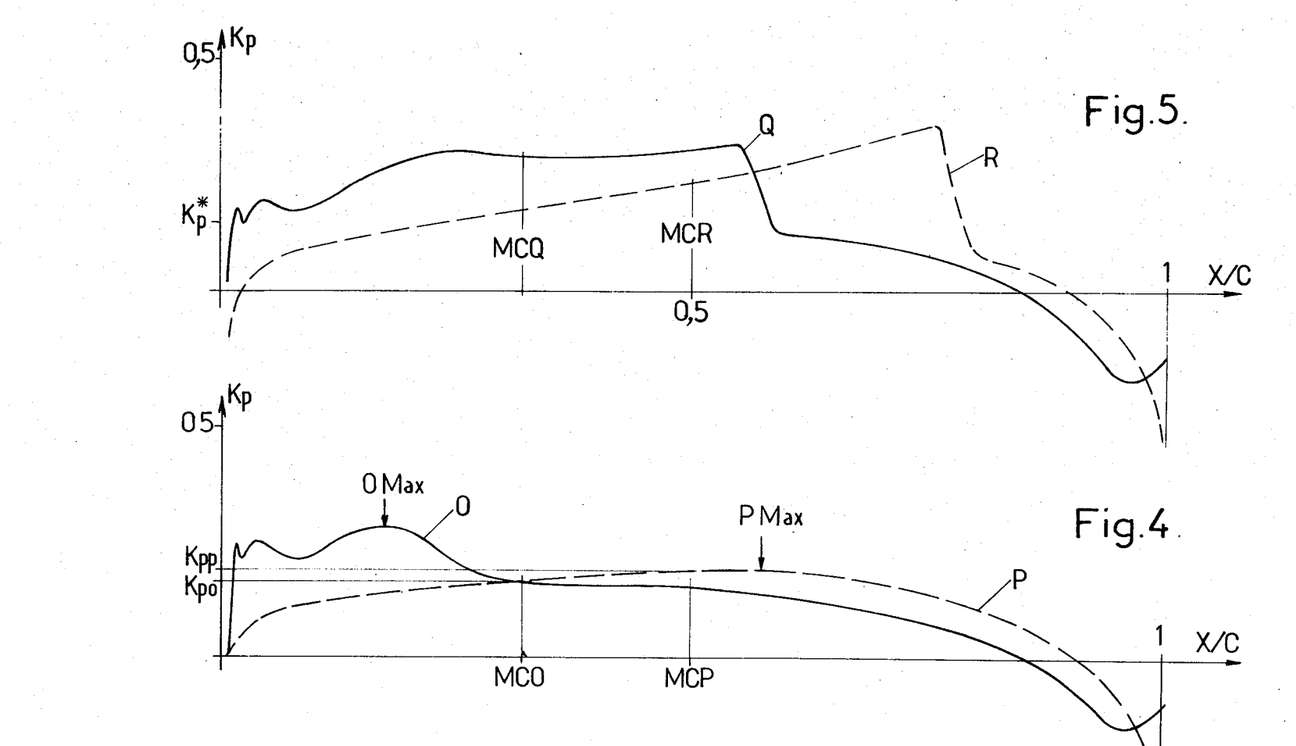
FIG. 4 is a diagram showing the pressure distribution Kp along the extrados or the intrados of a symmetrical profile (rectilinear skeleton) of 3.5% relative thickness with thicknesss variation in accordance with the invention (curve O) and of a symmetrical profile of 3.5% relative thickness with thickness variation according to the NACA 16 profile (curve P) for a Mach number of 0.88 and a zero lift coefficient $C_z$.
FIG. 5 is a diagram showing the pressure distribution Kp along the extrados or the intrados of a symmetrical profile of 3.5% relative thickness with thickness variation in accordance with the invention (curve Q) and of a symmetrical profile of 3.5% relative thickness with NACA 16 thickness variation (curve R) for a Mach number of 0.92 and a zero lift coefficient $C_z$.

This distribution of the curvatures in zone II and that in the third zone going from midships MCO to an abscissa point X/C=80%, where the curvature is substantially constant and equal to the value of point 17 (FIG. 1) provides perfect control of the flow, even when the Mach number increases, as shown in FIG. 5 representing the calculated pressure distribution for a Mach number of 0.92.

In fact, the development of the supersonic zone with the Mach number is effected without increase of the overspeed and the intensity of the shock wave terminating this supersonic zone remains moderate even at a high Mach number. FIG. 5 shows that, compared with the thickness law of a conventional profile of the NACA 16 family, the thickness law of the invention allows less intense shock waves to be obtained situated further upstream, which delays the appearance of unsticking of the limit layer and ensures a low drag level at high Mach numbers.

Finally, zone 4 of the extrados, which extends between point 18 of abscissa x/C=0.80 and the trailing edge 13 and which comprises a curvature inversion, situated advantageously at the point of abscissa $x/C=0.88$, confers on the profile of the invention a particular geometry at the trailing edge, characterized by an almost constant thickness which produces a slight acceleration between 95% of the chord and the trailing edge, also contributing to reducing the drag of the profile and to delaying unsticking of the limit layer.

Zones III and IV may be represented by the formula (2) hereafter between midships and the trailing edge:

$$y = U_8 x^7 + U_9 x^6 + U_{10} x^5 + U_{11} x^4 + U_{12} x^3 + U_{13} x^2 + U_{14} + U_{15} \quad (2)$$

The constant coefficients $U_8$–$U_{15}$ are obviously chosen as a function of those of equation (1) to ensure continuity of the profile at point 17. They may have the following values in the case already considered of a relative thickness $e_{max}/C=0.035$ and midships at 32% of the chord.

$U_8 = 8.4058$
$U_9 = -34.3764$
$U_{10} = 58.4983$
$U_{11} = -53.5964$
$U_{12} = 28.4971$
$U_{13} = -8.8134$
$U_{14} = 0.1472$
$U_{15} = -0.0852$

The favorable effect of the thickness law which has just been defined is advantageously completed by a camber law according to another aspect of the invention, which allows excellent performances to be attained at high lifts for Mach numbers close to 0.6 corresponding to climbing and take-off speeds of the propellers.

The camber law may be represented, like the thickness law, by a curve in a system of axes in which the axis OX merges with the chord and the ordinate axis OA is orientted from the intrados towards the extrados. This chamber law may be broken down into three zones represented by functions, for example polynomial.

A first zone $I_a$, between the point of maximum curvature at the leading edge and the point of maximum camber $p_o$ may be defined approximately by a relation of the type:

$$a = m_1 x^3 + m_2 x^2 + m_3 x + m_4 x^{\frac{1}{2}} \quad (3)$$

A second zone $II_a$, between the point of maximum camber $p_o$ and a point situated approximately at the abscissa $x/C=0.65$ may be defined by a relationship of the type:

$$a = m_5 x^3 + m_6 x^2 + m_7 x + m_8 \quad (4)$$

A third zone $III_a$ situated between the point of abscissa $x/C=0.65$ and the trailing edge may be defined by a relationship of the types:

$$a = m_9 x^3 + m_{10} x^2 + m_{11} x + m_{12} \quad (5)$$

the different $m_i$ being constant coefficients and x being the abscissa related to the chord of the profile and a the ordinate related to the chord of the profile.

If the projection of the chord of the point of maximum camber is at 35% of the chord from the point of maximum curvature of the leading edge, i.e. $p_o = 0.35C$ and if the maximum camber $a_p$ is taken approximately equal to $0.0136C$, the coefficients may have the approximate following values:

| | |
|---|---|
| $m_1 = 0.1589$ | $m_7 = 0.0730$ |
| $m_2 = -0.2151$ | $m_8 = 0.00252$ |
| $m_3 = 0.0874$ | $m_9 = -0.01869$ |
| $m_4 = +0.00455$ | $m_{10} = 0.03069$ |
| $m_5 = 0.0694$ | $m_{11} = -0.03876$ |
| $m_6 = -0.1411$ | $m_{12} = 0.02676$ |

Figure 6:
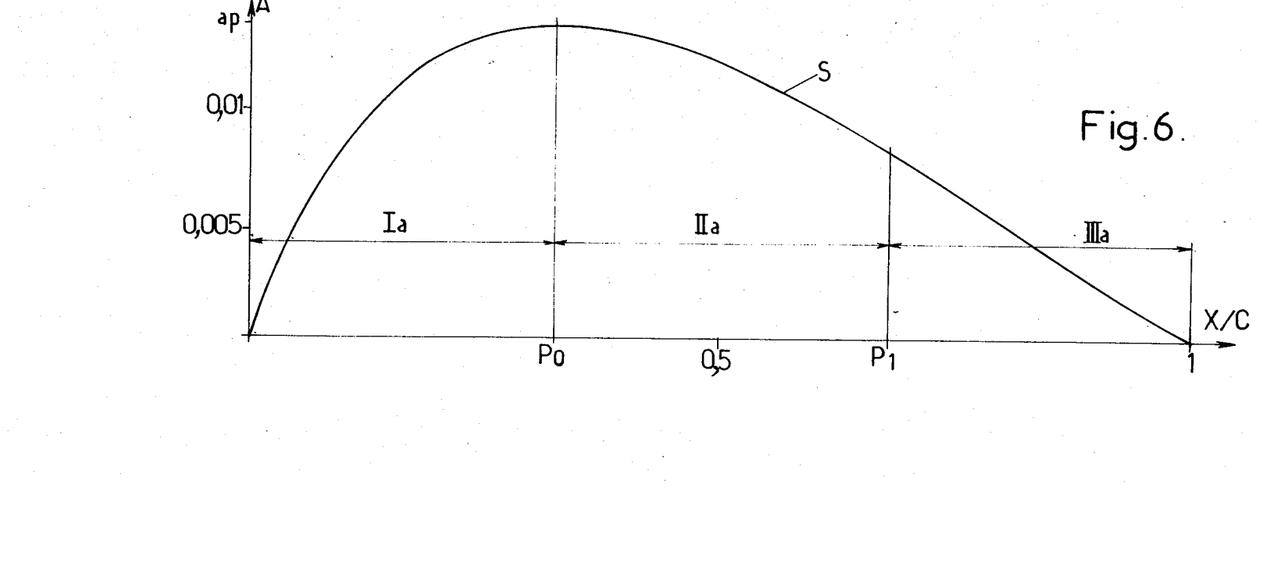
FIG. 6 shows schematically the skeleton of a profile having a camber law in accordance with the invention (scale of the ordinates, showing the camber related to the chord, being expanded)

FIG. 6 shows the variation of the reduced camber a along the chord for a profile according to the above equations (3), (4) and (5) for the values of the coefficients given by way of examples, i.e. the zones $I_a$, $II_a$ and $III_a$ of the mean line are defined by the equations:

Curve $I_a$ $$Y/C = 0.1589(X/C)^3 - 0.2151(X/C)^2 + 0.0874(X/C) = 0.0455 X/C$$

Curve $II_a$ $$Y/C = 0.0694(X/C)^3 - 0.01411(X/C)^2 + 0.0730(X/C) + 0.00252$$

Curve $III_a$ $$Y/C = 0.01869(X/C)^3 + 0.03069(X/C)^2 - 0.03876(X/C) + 0.02676$$

The pairing of this mean line and a thickness law in accordance with the invention allows maximum lift coefficients to be obtained at least equal to those obtained with the conventional profiles of the NACA 16000 series, at the same time as much lower moment coefficients, which is favorable for the mechanical strength of the blade.

Figure 7:
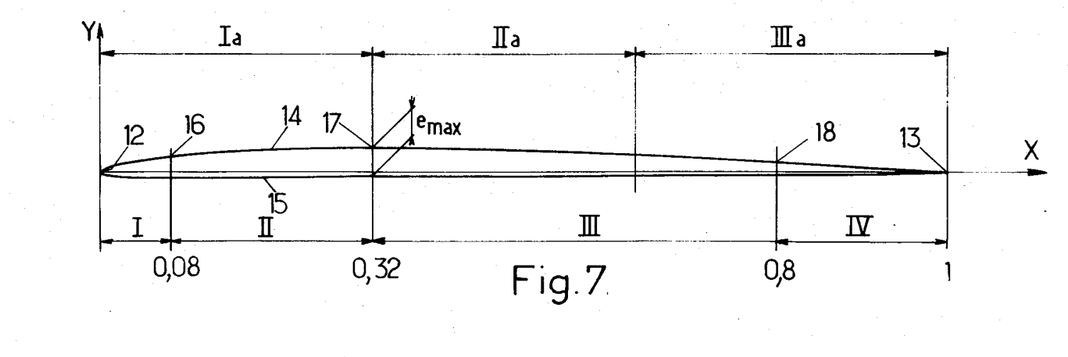
FIG. 7 is a general view of a particular blade profile in accordance with the invenion.

FIG. 7, where the elements corresponding to those of FIG. 1 bear the same reference, shows a dissymetrical profile in accordance with the invention, i.e. associating a camber law and a thickness law of the kind given above.

Figure 8:
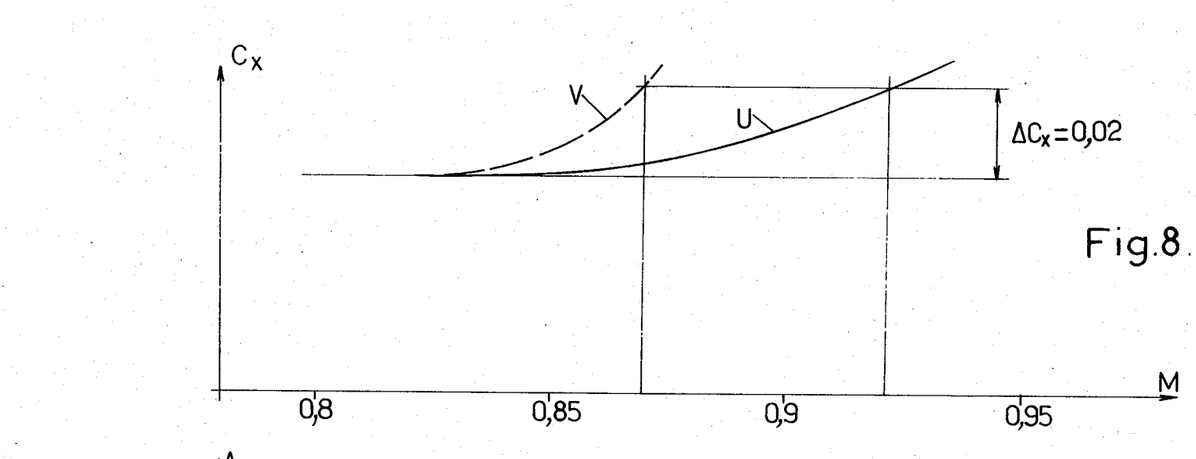
FIG. 8 is a diagram showing the evolution of the drag coefficient $C_x$ as a function of the Mach number for a profile in accordance with the invention (curve U) and for the known NACA 16304 profile (curve V) for a lift coefficient $C_z$ equal to 0.2.

By way of indication, FIG. 8 shows the results of comparative tests in a wind-tunnel carried out on a profile in accordance with the invention, of the kind shown in FIG. 7, and on a conventional reference NACA 16304 profile (with maximum relative thickness 4%). It can be seen from FIG. 8 that the increase in drag as a function of the Mach number is much more delayed on the profile of the invention (curve U) as compared with the NACA profile (curve V). The Mach gain on the drag divergence (corresponding to a drag increase $C_x = 0.002$ with respect to the initial drag) is about 5%.

Figure 9:
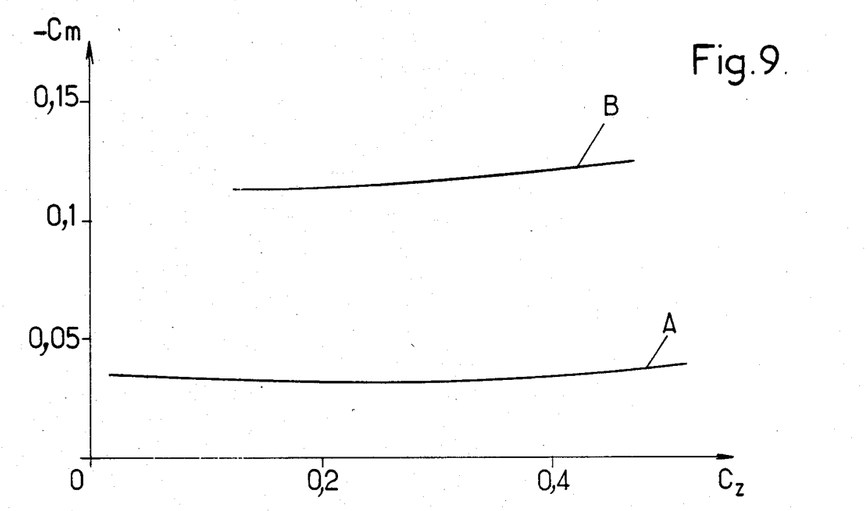
FIG. 9 is a diagram showing the evolution of the coefficient of moment $C_m$ as a function of the lift coefficient $C_z$ for a profile in accordance with the invention (curve A) and for the known NACA 16304 profile (curve B) for a Mach number close to 0.85.

FIG. 9 shows that there is also a gain on the moment coefficient C. The curves, which give the variation of the moment coefficient $C_m$ as a function of the lift $C_z$ for Mach 0.85, show a reduction of the moment of about 70% (curve A) with respect to the NACA profile (curve B).

Figure 10:
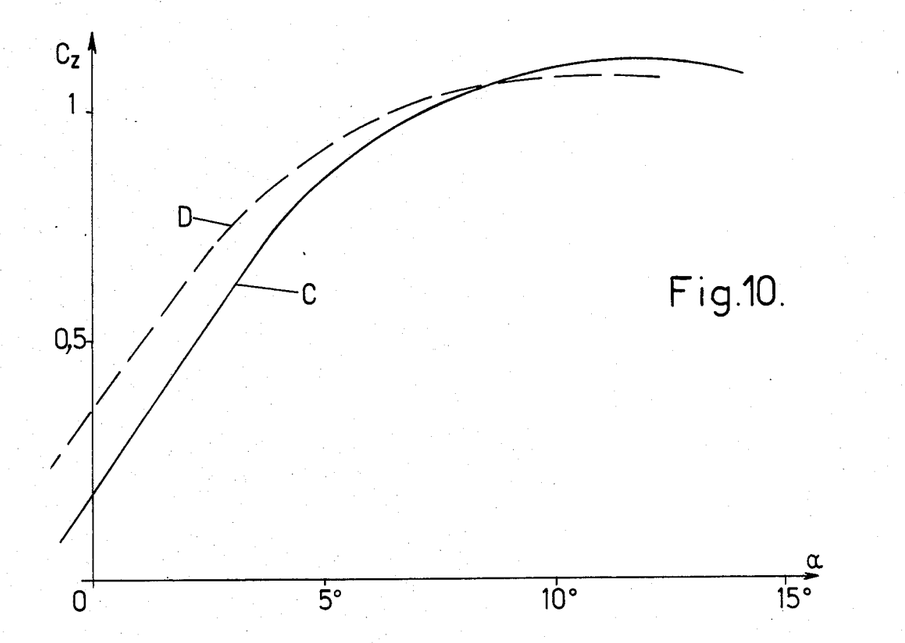
FIG. 10 is a diagram illustrating the lift coefficient $C_z$ as a function of the incidence $\alpha$ for a profile in accordance with the invention (curve C) and for the known NACA 16304 profile (curve D), for M=0.6.

Finally, FIG. 10, which gives the lift values $C_z$ obtained for different incidences by means of the profile of the invention (curve C) and for the reference profile (curve D) show that the lift levels are substantially the same, so that the gain on the other characteristics is not accompanied by any decrease in lift.

The invention allows then the successive profiles of a high performance propeller blade to be defined applicable to any type of aircraft propulsion unit. Once the camber law has been chosen and the mean line plotted, it is sufficient to trace, orthogonally to the mean line, the thickness law according to the conventional technique also used for the NACA profiles, while taking into account the maximum relative thickness chosen.

In the case where representation of the curvature and of the thickness by the above mentioned function (1) to (5) is used and where the coefficients are those given by way of examples above, the extrados and the intrados of the profile have the following approximate reduced values:

| Intrados | | Extrados | |
|---|---|---|---|
| X/C | Y/C | X/C | Y/C |
| 0.000000 | 0.000000 | 0.000000 | 0.000000 |
| .001360 | .002220 | .000130 | .000620 |
| .005510 | .003730 | .003100 | .003800 |
| .009720 | .004450 | .007930 | .006340 |
| .014460 | .004940 | .013800 | .008310 |
| .020150 | .005390 | .021120 | .010420 |
| .027050 | .005720 | .030210 | .012470 |
| .035500 | .005920 | .041340 | .014520 |
| .045810 | .006010 | .054840 | .016610 |
| .058310 | .006000 | .071010 | .018750 |
| .073300 | .005940 | .090150 | .020940 |
| .091100 | .005830 | .112580 | .023190 |
| .112020 | .005680 | .138570 | .025320 |
| .136330 | .005560 | .168400 | .027310 |
| .182980 | .005070 | .202290 | .028970 |
| .232260 | .004640 | .240450 | .030080 |
| .298850 | .004220 | .282970 | .030690 |
| .366270 | .004130 | .329920 | .030930 |
| .453370 | .004550 | .381220 | .030680 |
| .537290 | .004920 | .448230 | .029670 |
| .639470 | .005110 | .545630 | .026850 |
| .717880 | .005010 | .636240 | .023150 |
| .782170 | .004600 | .741590 | .017590 |
| .843260 | .003730 | .805450 | .013680 |
| .898590 | .002410 | .865080 | .009540 |
| .945070 | .000930 | .917670 | .005340 |
| .979200 | .000840 | .960020 | .002450 |
| 1.000000 | .001290 | 1.000000 | .001290 |

As has already been pointed out above, the profiles of the invention will generally be used solely in the external part of propeller blades, from the relative radius 0.6 and even often from the relative radius 0.7 only. The internal part may for example present a series 65 NACA profile at the root or socket and a connection zone proximate the profiles of the invention. The relative thickness may also evolve from the root to the blade end. For transsonic speed application, the propeller blades will generally have a variable sweep-back angle, increasing more especially in the external part of the blade. Thus, the range of use of the blades may be extended up to cruising Mach numbers of about 0.85.

We claim:

1. A propeller blade for aircraft, having a profile which, at least at the radially outer part of said blade, has a thickness law such that the curve representing the distance from the camber line
   (a) has a curvature which decreases from a maximum value at the leading edge which is about $0.5C/(e_{max})^2$ in a first zone extending from the leading edge which represents a fraction of the length of the chord of the profile of from 1 to 10%, $e_{max}$ being the maximum thickness and C being the chord length, and
   (b) has an approximately linear decreasing curvature in a second zone following said first zone and extending approximately up to the maximum thickness of the cross-section, at a point situated between 28 and 35% of the length of the chord from the leading edge, the average rate of curvature decrease in said first zone being rapid as compared with the rate of curvature decrease in the second zone.

2. A blade according to claim 1, wherein said second zone extends over that fraction of the length of the chord which is comprised substantially between 8 and 32% of the length from the leading edge.

3. A blade according to claim 1, wherein the curvature of the curve representing the thickness variation law is approximately equal to $1.5e_{max}/C$ at the end of the second zone.

4. A blade according to claim 1, wherein the curvature of the thickness law is substantially constant over a third zone extending from the point of maximum thickness up to a point at from 75 to 80% of the chord from the leading edge and presents an inversion in a fourth zone extending up to the trailing edge of the cross-section.

5. A blade according to claim 4, wherein the fourth zone extends from a point at about 80% of the chord up to the trailing edge and comprises a curvature inversion in a portion comprised between 90% of the chord and the trailing edge.

6. A blade according to claim 4, wherein the profile has a maximum camber $a_p$ of from 0.75 to $0.85a_c$, $a_c$ representing the maximum camber of a conventional NACA series 16 profile for a propeller blade.

7. A blade according to claim 6, wherein the mean line of the blade cross section exhibits a maximum camber at a point situated at about 35% of the chord from the leading edge.

8. A blade according to claim 6, wherein the law of variation of the camber is represented by three different functions in three successive zones from the leading edge toward the trailing edge.

9. A blade according to claim 1, wherein said profile has a relative thickness of from 2 to 6%.

10. A propeller blade according to claim 1, wherein a radially inner zone from 70% at most of the radius has a conventional NACA series 16 profile.

11. A propeller blade according to claim 1, wherein a curve representing the rate of curvature decrease in said first zone merges with a curve representing the rate of curvature decrease in said second zone at the junction between the two zones.

12. A propeller blade for aircraft, having a cross-section which, at least in the radially outer part of said blade, has a thickness whose chordwise variation is represented by a curve having a curvature which decreases rapidly in a first zone from the leading edge to a point located at a distance from the leading edge which represents a fraction of the length of the chord of the profile of from 7 to 10% and an approximately linearly decreasing curvature in a second zone following said first zone and extending approximately up to a maximum thickness of the cross-section, said maximum thickness being at a distance from the leading edge which is from 28% to 35% of the chord length, wherein the profile has a maximum camber $a_p$ of from 0.75 to $0.85a_c$, $a_c$ representing the maximum camber of a conventional NACA series 16 profile for a propeller blade, and wherein said curvature decreases in said first zone at a rate which is variable from a higher value near the leading edge to a lower value at the end of said first zone where it is substantially equal to the rate of said linear decrease.

13. A blade outer section for an aircraft propeller designed for improved operation at a Mach number between 0.8 and 0.9, having a profile whose thickness has a chordwise variation represented by a curve having a curvature which (a) rapidly decreases from a maximum value at the leading edge in a first zone extending from said leading edge up to a point located chordwise at a distance from said leading edge of from 0.07 to 0.10 of the chord length, (b) has an approximately linear decrease in a second zone merging with said first zone and extending approximately up to the maximum thickness of said profile, at a point situated between 0.28 and 0.35 of the chord length from the leading edge, wherein said curvature decreases in said first zone at a rate which is variable from a higher value near the leading edge to a lower value at the end of said first zone where it is substantially equal to the rate of said linear decrease, (c) is substantially constant over a third zone merging with said second zone, and (d) exhibits an inversion in a fourth zone merging with said third zone and extending up to the trailing edge of the profile.

14. A blade outer section according to claim 13, wherein the extrados and the intrados of said profile are represented by the reduced values

| Intrados | | Extrados | |
| --- | --- | --- | --- |
| X/C | Y/C | X/C | Y/C |
| 0.000000 | 0.000000 | 0.000000 | 0.000000 |
| .001360 | .002220 | .000130 | .000620 |
| .005510 | .003730 | .003100 | .003800 |
| .009720 | .004450 | .007930 | .006340 |
| .014460 | .004940 | .013800 | .008310 |
| .020150 | .005390 | .021120 | .010420 |
| .027050 | .005720 | .030210 | .012470 |
| .035500 | .005920 | .041340 | .014520 |
| .045810 | .006010 | .054840 | .016610 |
| .058310 | .006000 | .071010 | .018750 |
| .073300 | .005940 | .090150 | .020940 |
| .091100 | .005830 | .112580 | .023190 |
| .112020 | .005680 | .138570 | .025320 |
| .136330 | .005560 | .168400 | .027310 |
| .182980 | .005070 | .202290 | .028970 |
| .232260 | .004640 | .240450 | .030080 |
| .298850 | .004220 | .282970 | .030690 |
| .366270 | .004130 | .329920 | .030930 |
| .453370 | .004550 | .381220 | .030680 |
| .537290 | .004920 | .448230 | .029670 |
| .639470 | .005110 | .545630 | .026850 |
| .717880 | .005010 | .636240 | .023150 |
| .782170 | .004600 | .741590 | .017590 |
| .843260 | .003730 | .805450 | .013680 |
| .898590 | .002410 | .865080 | .009540 |
| .945070 | .000930 | .917670 | .005340 |
| .979200 | .000840 | .960020 | .002450 |
| 1.000000 | .001290 | 1.000000 | .001290 | wherein X represents the distance from the leading edge along the chord, Y represents the distance from the chord, and C designates the chord length.

* * * * *